United States Patent [19]

Ichihashi et al.

[11] Patent Number: 4,695,855
[45] Date of Patent: Sep. 22, 1987

[54] INK JET RECORDER

[75] Inventors: Hiroo Ichihashi, Hiratsuka; Masakazu Ozawa, Ebina; Ryuichi Ebinuma, Hiratsuka; Atsushi Saito, Yokohama, all of Japan

[73] Assignee: Canon Kabushiki Kaisha, Tokyo, Japan

[21] Appl. No.: 901,739

[22] Filed: Aug. 29, 1986

[30] Foreign Application Priority Data

Sep. 4, 1985 [JP] Japan ................. 60-193864

[51] Int. Cl.$^4$ ........................................... G01D 15/16
[52] U.S. Cl. .................................. 346/145; 200/50 A
[58] Field of Search ..................... 346/145, 140, 75; 200/61.58 R, 333, 334, 50 A

[56] References Cited

U.S. PATENT DOCUMENTS 3,712,819  1/1973  Field ............................. 200/50 A X
4,071,722  1/1978  Hart .............................. 200/50 A
4,369,454  1/1983  Kyogoku ........................... 346/140
4,563,552  1/1986  Fushimoto ..................... 200/50 A X Primary Examiner—Joseph W. Hartary
Attorney, Agent, or Firm—Fitzpatrick, Cella, Harper & Scinto

[57] ABSTRACT

An ink jet recorder has a head assembly removably mounted on a recorder body, said head assembly having a plurality of head elements each including a plurality of nozzles arranged widthwise of a record sheet, and a removable cover for covering front sides of said head elements, comprising a connector for electrical connection with the recorder body removably mounted on the head assembly by a lever, and a knob mounted on the cover to mechanically engage or disengage the head assembly with or from the recorder body, the cover being constructed such that it cannot be mounted unless the lever is in a position to disconnect the connector.

6 Claims, 16 Drawing Figures

FIG. 10
FIG. 11
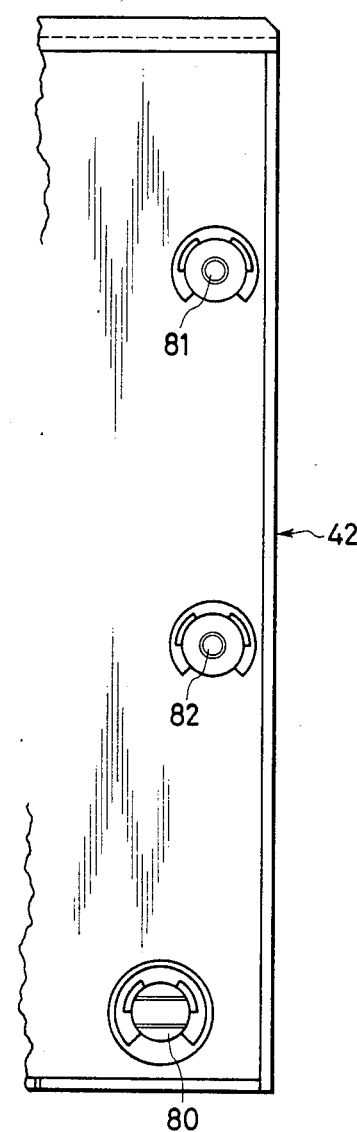
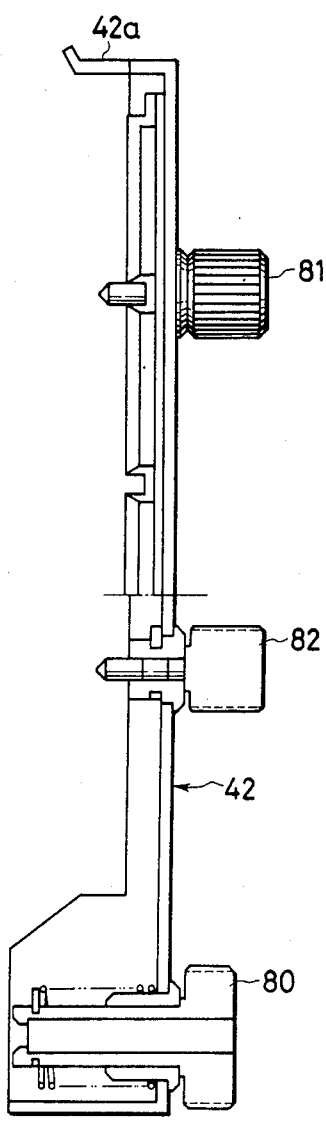

INK JET RECORDER

BACKGROUND OF THE INVENTION

1. Field of the Invention

The present invention relates to an ink jet recorder, and more particularly to an ink jet recorder capable of recording in multiple colors.

2. Related Background Art

A multi-color ink jet recorder uses black, cyan, magenta and yellow inks, for example, and has ink jet heads for the respective colors. It discharges the inks of the respective colors as dots in accordance with a record command to record a seven-color record on a record sheet by a combination of a plurality of colors.

When such a multi-color ink jet recorder is used, the number of nozzles of the heads may be around 2,000 per color. The diameter of an orifice at the end of each nozzle is very small, for example, several tens of microns, and control of the jetting of droplets is very difficult.

Various mechanisms for jetting droplets in such a color ink jet printer have been proposed. A so-called bubble jet system in which bubbles are forcibly generated at the nozzles and the inks are discharged from the orifices by the rise in ink pressure in the nozzles has been well known.

The ink jet printer of this type can be modular in construction and the modules are removably designed to facilitate maintenance and transportation.

Since the ink jet printer of this type uses liquids inks, non-discharge of the ink may occur by drying of the inks or bubbles due to gases in the inks.

Such non-discharge may be also caused by clog of the orifice by fat or dust deposited when the fingers of an operator contact the head unit when it is mounted or removed.

It has been proposed to cover the head unit when it is mounted or removed so that the fingers of the operator do not contact the head unit.

On the other hand, when the unit is to be mounted or removed, it is necessary to connect or disconnect electrical connections and ink paths. Accordingly, connectors and valves are used so that connection and disconnection are automatically made when the unit is mounted or removed.

The above construction raises the following problem. The attachment and removal of the cover to cover the head, and the electrical connection/disconnection work are independent works which are not related to each other. As a result, even if the cover is attached, the unit may be removed without disconnecting the electrical connection and the electrical connection may be destroyed. Whatever care the operator may pay, such a failure will occur at a certain probability, and the recorder is not usable during such a failure.

SUMMARY OF THE INVENTION

It is an object of the present invention to provide an ink jet recorder having a cover for covering a head unit and electrical connection/disconnection means in which a covering operation and the disconnecting operation are correlated to each other.

It is another object of the present invention to provide an ink jet recorder wherein a cover and electrical connection/disconnection means are complementary in the operation thereof so that a safety mechanism is assured and break of the electrical connection means in the removal of the unit is prevented.

It is another object of the present invention to provide an ink jet recorder wherein a cover to cover the head and means for releasing an electrical connector are linked so that one cannot be mounted or removed when only the other is mounted or removed.

It is another object of the present invention to provide an ink jet recorder having a head assembly including a head element for recording by discharging liquid removably mounted, comprising coupling means for coupling, the head assembly to a recorder body, and switch means for turning on and off a power supply to the head assembly. The coupling means couples and decouples the head element by coupling/decoupling means arranged on a cover which covers a front of the head element, and the switch means has its movement limited in such a direction that the power supply is not turned on by mounting or removing the cover.

BRIEF DESCRIPTION OF THE DRAWINGS

FIG. 10 is a partial enlarged rear view of a cover, FIG. 11 is a partial longitudinal side view of a cover.

DETAILED DESCRIPTION OF THE PREFERRED EMBODIMENTS

[Flow paths]

Figure 1:
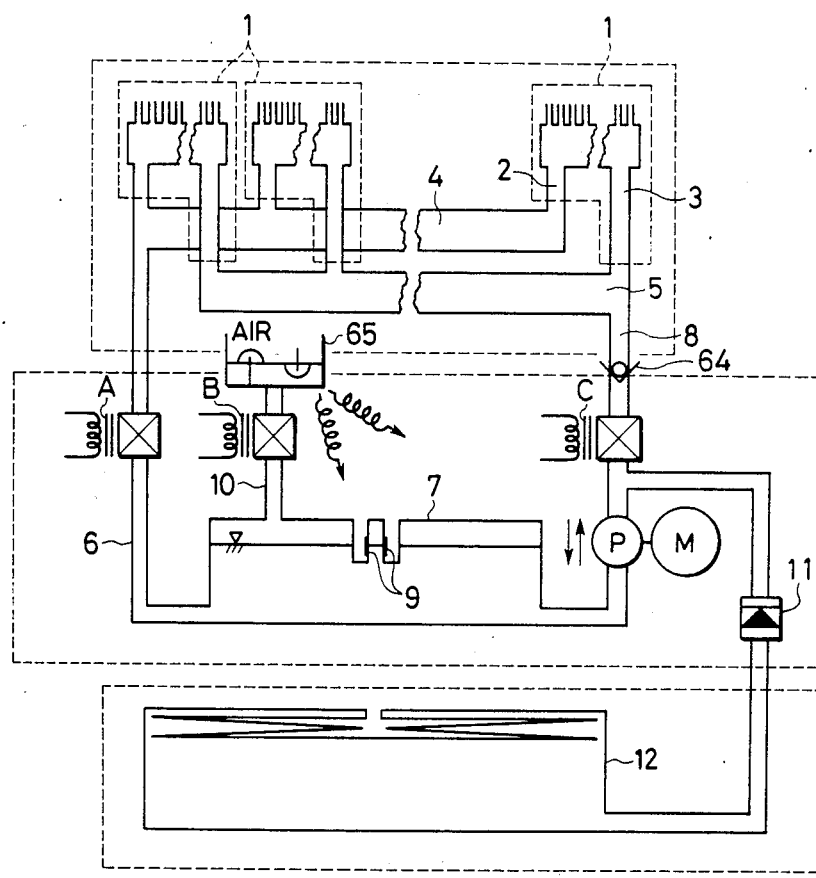
FIG. 1 shows ink flow paths.

FIG. 1 shows one embodiment of the present invention and shows flow paths of an ink jet printer to which the present invention is applied.

Numeral 1 denotes a bubble jet type head element. A plurality of head elements each having a plurality of nozzles are arranged widthwise of a record sheet.

Each head element 1 has two flow paths 2 and 3, one path 2 being connected to a distributor flow path 4 and the other flow path 3 being connected to a distributor flow path 5. The distributor flow path 4 is connected to a first ink tank 7 through a flow path 6 and a solenoid valve A is inserted in the flow path 6. The other distributor flow path 5 is connected to the first ink tank 7 through a flow path 8. A solenoid valve C and a pump P are inserted in the flow path 8. The pump P is driven by a reversible motor M to switch a direction of supply of the ink.

A liquid level sensor 9 is mounted on the first ink tank 7 to continuously monitor a liquid level of the ink. The first ink tank 7 is opened to atmosphere through a pipe 10 and a solenoid valve B inserted therein to keep pressure in the tank constant.

A removable second ink tank 12 is connected through a check valve 11 to the flow path 8 between the solenoid valve C and the pump P.

In the embodiment shown in FIG. 1, an arrangement used for only one color is shown. In a multi-color printer, the above flow paths are provided one set for each color in multi-layer. A check valve 64 is provided in the flow path connecting the head element to the pump. The check valve 64 permits the flow of the ink to the head element 1.

An overflow sensor 65 which also serves as a breather is mounted at an end of a tube 10 of the first ink tank 7 facing the atmosphere through the solenoid valve B.

[Overall construction]

Figure 2:
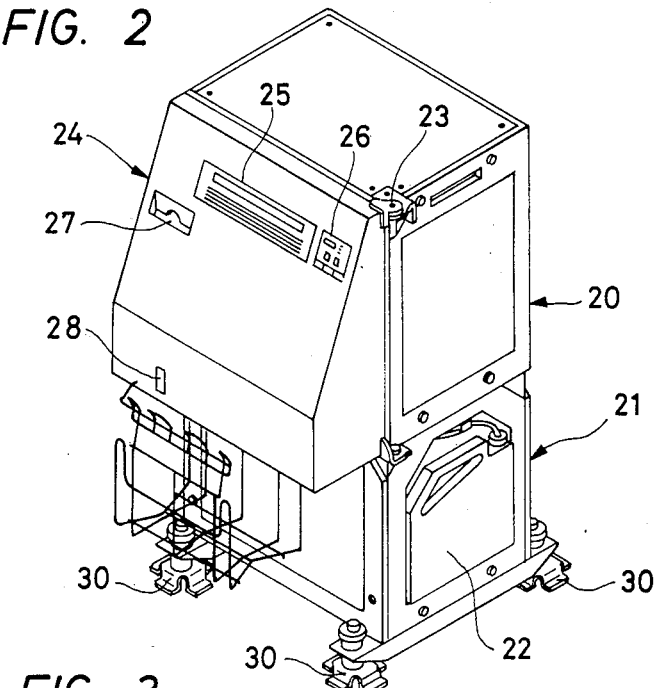
FIGS. 2 and 3 show outer perspective view of a printer and perspective view in an open state of a paper feed unit.

An overall color ink jet printer having the flow paths described above are shown in FIGS. 2 and 3. It shows a bubble jet type on-demand printer. Numeral 20 denotes an upper unit in which a head unit is housed. Placed below the upper unit 20 is a lower unit 21 in which a power supply is housed. A removable drain tank 22 is mounted on the lower unit 21 so that it is visible externally. A paper feed unit 24 which may be opened and closed by a hinge 23 is mounted on a front side of the upper unit 20. A flap 25 is removably attached to a front top of the paper feed unit 24. The flap 25 serves to cover a paper eject part and it is removed by an operator during the print operation.

A console panel 26 is provided adjacent to the flap 25, and numeral 27 denotes a pocket in which manuals or the like are housed. An opening 28 is formed at a front bottom of the paper feed unit 24 to allow observation of remaining record sheets. A stacker 29 formed by bending steel wires is arranged at a bottom of the paper feed unit 24. Base units 30 are attached to a bottom of the lower unit 21. A paper feed mechanism 31 is arranged in the paper feed unit 24 and an accommodation space for the record sheets is provided thereunder.

The upper unit 20 serves as a housing for the head unit, and a bubble jet assembly (BJA) 33 which is a head assembly is removably mounted thereon. A cap 34' is vertically movably mounted near a front side of the BJA 33.

[Structure of BJA]

Figure 4:
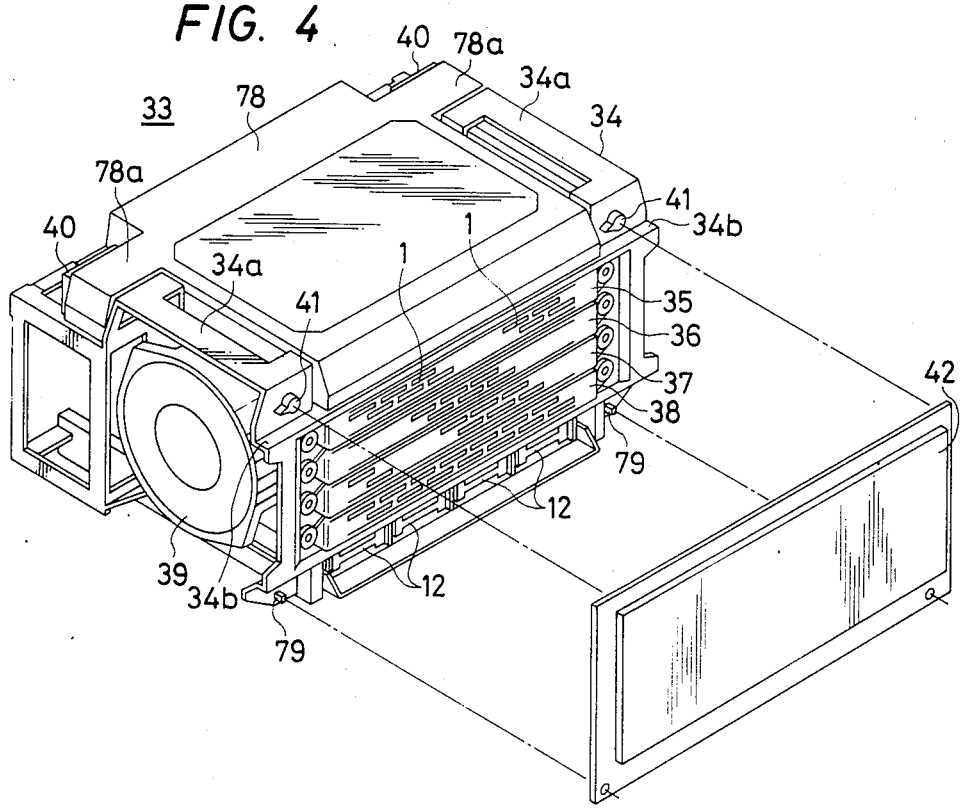
FIG. 4 shows a perspective view of a bubble jet assembly (BJA)

The BJA 33 is constructed as shown in FIG. 4. It is assembled on a rigid frame 34 and removably mounted in an upper space of the upper unit 20. On the frame 34, four bubble jet units (BJU's) 35–38 are removably mounted on a front side thereof. In the present embodiment, the BJU's 35–38 are for black, cyan, magenta and yellow, respectively. The BJU's 35–38 each has a plurality of head elements 1 each in turn has a number of nozzles, for example, 128 nozzles (not shown). In each of the BJU's 35–38, the head elements 1 are arranged in zigzag in two vertically arranged stages with nozzles in the upper and lower stages being arranged not to overlap each other.

Second ink tanks 12 filled with ink of various colors are mounted in the lower stages of the BJU's 35–38. They are connected to first ink tanks 7 to be described later. The connections are automatically made by loading the second ink tanks 12. Fans 39 for supplying cooling air are mounted on the left and right ends of the frame 34 of the BJA 33.

The BJA 33 thus constructed is removably mounted in the upper frame 20 by the operator who grasps left and right handles 34a of the frame 34. When it is mounted, it is automatically connected to power supply terminals of the upper frame 20 through a connector arranged at a rear end of the frame 34.

Numeral 41 denotes knobs for locking and unlocking the connector 40. Numeral 42 denotes a cover for covering the BJU's 35–38.

A safety mechanism including a link mechanism for the cover 42 and a lever 41 will be explained later. The cover 42 is attached when the BJA 33 is to be mounted or removed. Since the diameter of the nozzle formed in the head element 1 is very small and it may be clogged by a contact by a finger, the cover is mounted whenever the BJA 33 is handled.

[Structure of Cap]

Figure 3:
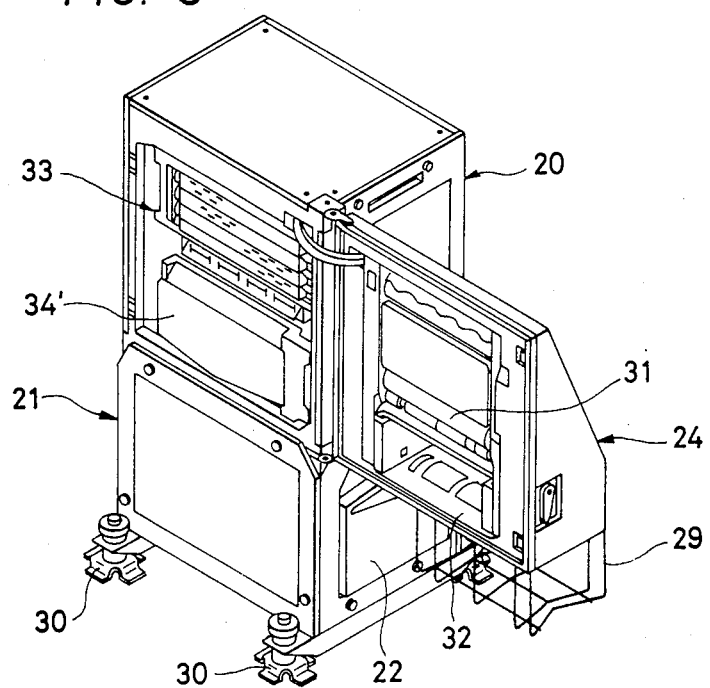
Figure 5:
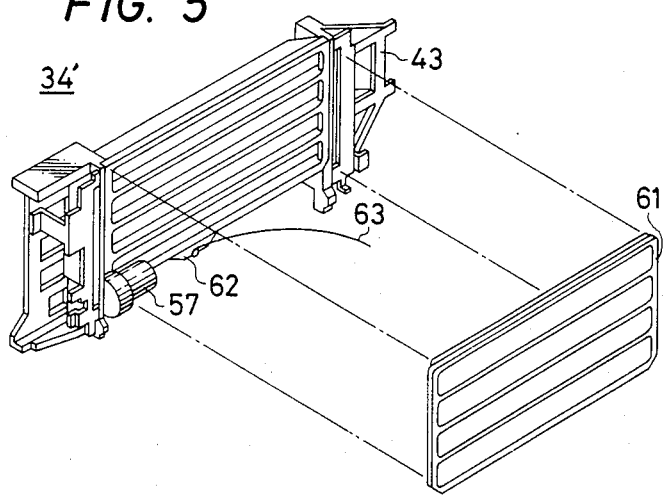
FIG. 5 shows a perspective view of a cap.
Figure 6:
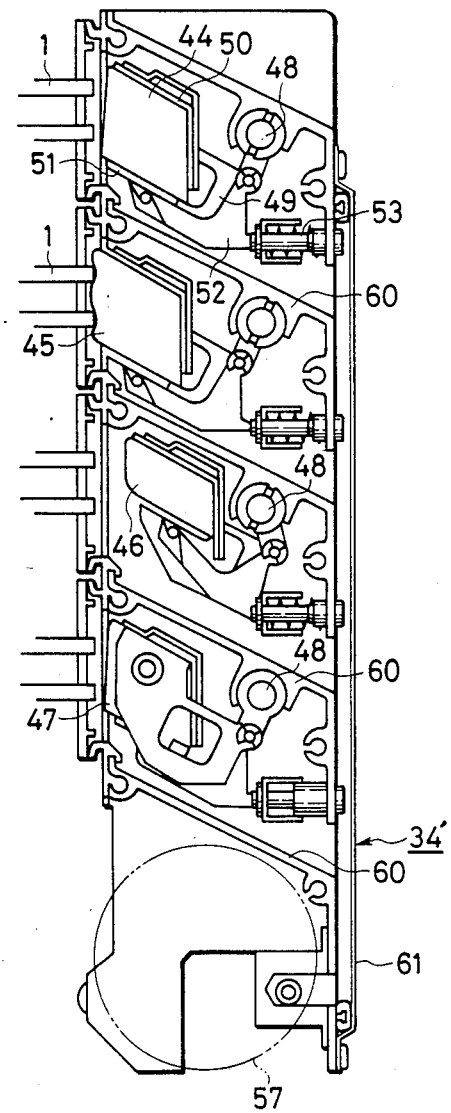
FIGS. 6 and 7 show longitudinal sectional view and side view of the cap.
Figure 7:
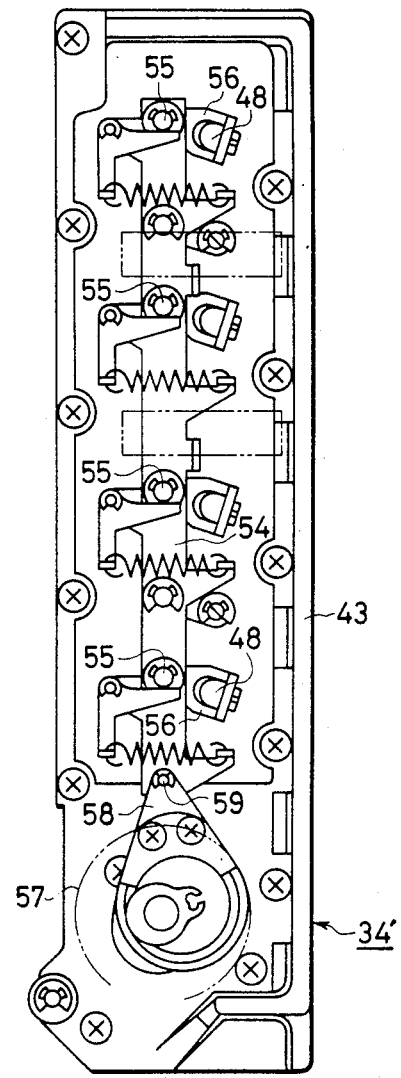

The vertically movable cap 34' is constructed as shown in FIGS. 5 and 6. The cap 34' is assembled on a rigid frame 43 and vertically movable by a drive unit (not shown). It is movable between a position at which the BJA 33 is covered and a position downwardly spaced from the BJA 33 as shown in FIG. 3. Ink absorbers 44–47 which cover the head elements of the BJU's 35–38 are housed in the cap 34'. The ink absorbers 44–47 are housed in support frames 50 fixed to arms 49 pivotably supported to the frame 43 by shafts 48, and squeeze plates 51 are arranged under the ink absorbers 44–47. The squeeze plates 51 are fixed to ends of arms 52. Numeral 53 denotes stoppers to which rear ends of the arms 52 contact.

A lever 54 is vertically movably arranged on an outer edge of the frame 43. Ends of four arms 56 are pivotably supported to the lever 54 by pins 55, and other ends of the arms 56 are connected to the shaft 48. A bottom end of the lever 54 is pivotably supported by a pin 59 to an end of a rotatable arm 58 which is rotated by a motor 57. Accordingly, as the motor 57 is rotated and the rotatable arm 58 is rotated, the lever 54 descends and the shaft 48 is rotated through the arm 56. As a result, as shown in FIG. 6, the support frame 50 descends through the arm 49 and the arm 52 abuts against a stop 53 and is prevented from moving. Thus, the squeeze plate 51 rises to constract the ink absorbers 44. As the lever 54 rises, they restores their original states.

FIG. 6 shows a sectional view which illustrates operation of the absorbers 44 with time. As the arms 49 rotate, the ink absorbers 44 make arcuate motion. In the course of the motion, the ink absorber contacts to the nozzles of the head element 1 as shown in the second stage in FIG. 6, absorbs the ink, and the absorbed ink is squeezed.

On the other hand, as shown in FIG. 6, the ink absorbers 44–47 are housed in an elongated chamber sectioned by inclined partitions 60, and a cover 61 is fixed to an outer surface of the frame 43 on lower sides of the partition plates 60. A flat space defined by the cover 61 provides a path through which the squeezed ink drops. It is collected to an ink reservoir 62 at the bottom in FIG. 5 and supplied to the drain tank 22 through a tube 63.

[Structure of Frame]

Figure 9:
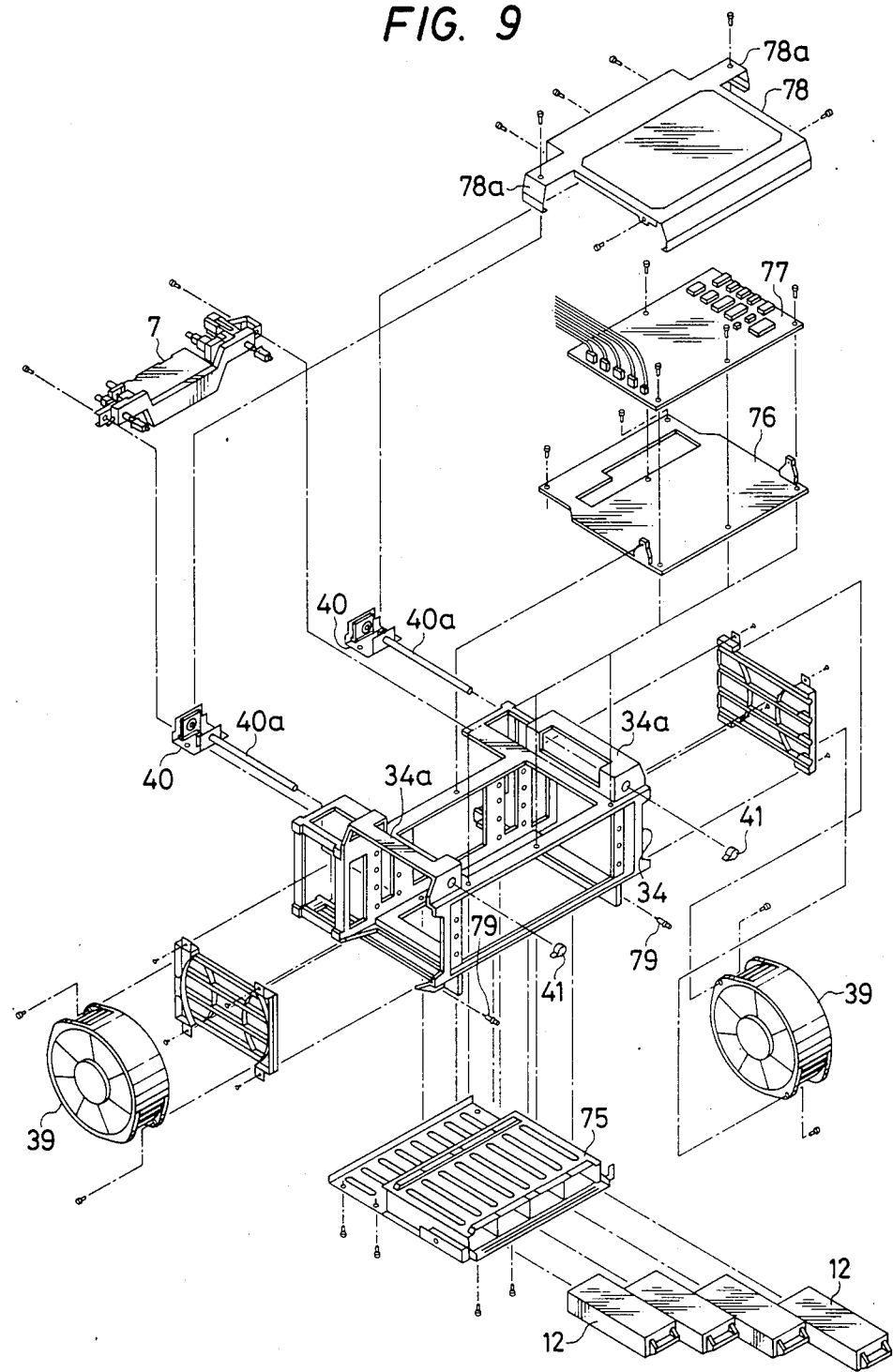
FIG. 9 is a developed perspective view of a frame.

FIG. 9 shows the frame 34 of the BJA 33 with the BJU's 35–38 being removed. Left and right pairs of connectors 40 and levers 41 are arranged on left and right grips 34a of the frame 34. The levers 41 are connected to the connector through rods 40a which drive the connector 40. Electrical connection/disconnection is made with the connector (not shown) mounted on the recorder body by driving the lever 41. A frame 75 for housing the second ink tank 12 is fixed at the bottom of the frame 34. The second ink tank is of cartridge type and removably mounted. The first ink tank 7 is fixed to the back of the frame 34. A circuit board 77 is fixed to the top surface of the frame 34 with a pate 76 being interposed therebetween, and a cover 78 is fixed thereon. The connector 40 is supported by left and right arms 78a of the cover 78.

[Structure of Cover]

FIGS. 10 and 11 show details of the cover 42 which is mounted to cover the BJU's 35-38. The cover 42 has, at a top thereof, a bent portion 42a which is to be engaged with steps 34b formed at front ends of the grips 34a of the frame 34 on left and right side thereof, and has, at a bottom thereof, a knob 80 adapted to engage with and disengage from lock pins 79 mounted on left and right sides on a front bottom of the frame 34, mounted thereon. Two knobs 81 and 82 are vertically arranged at left and right ends of the cover 42 and are removably threadedly attached to the frame 34.

The lock pin 79 which serves as the coupling means can be handled only by the knob 80 which serves as the engage/disengage means. The lock pin 79 can engage with and disengage from the recorder body.

Figure 12A:
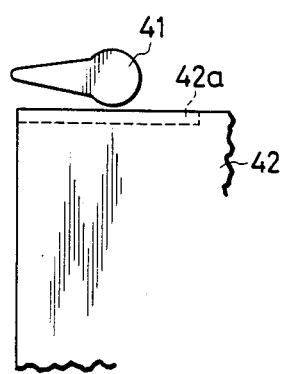
FIGS. 12A–C show a positional relationship between levers and the cover.

A relationship between the lever 41 and the bent portion 42a of the cover 42 is illustrated in FIG. 12A. The lever 41 is in a horizontal position when the connector is in an off position. The bent portion 42a can be engaged with the step 34b and the cover 42 can be attached only in this position. When the cover 42 has been attached, the lever 41 is not rotated even if one attempts to rotate the lever 41 to turn on the connector, and the connector cannot be turned on while the cover has been mounted. Unless the knob 80 is turned while the cover has been attached, the engagement of the BJA with the recorder body by the lock pin 79 is not released.

Since the cover 42 has the function described above, it serves as a safety device. When the BJA is mounted or removed, the cover is always attached to protect the head element 1, and electrical connection/disconnection and mechanical engagement/disengagement can be attained only in the safe condition. Accordingly, breakage of the elements by careless handling is prevented.

Figure 12B:
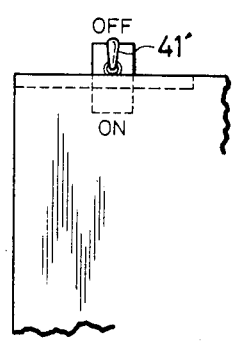
Figure 12C:
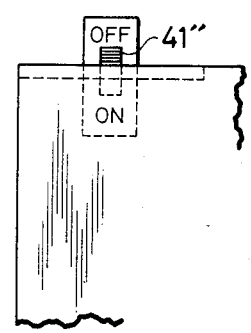

For the purpose of electrical on/off, the lever 41 may have snap-on type or slide type lever 41' or 41" as shown in FIGS. 12B and 12C.

[Structure of First Ink Tank]

Figure 13:
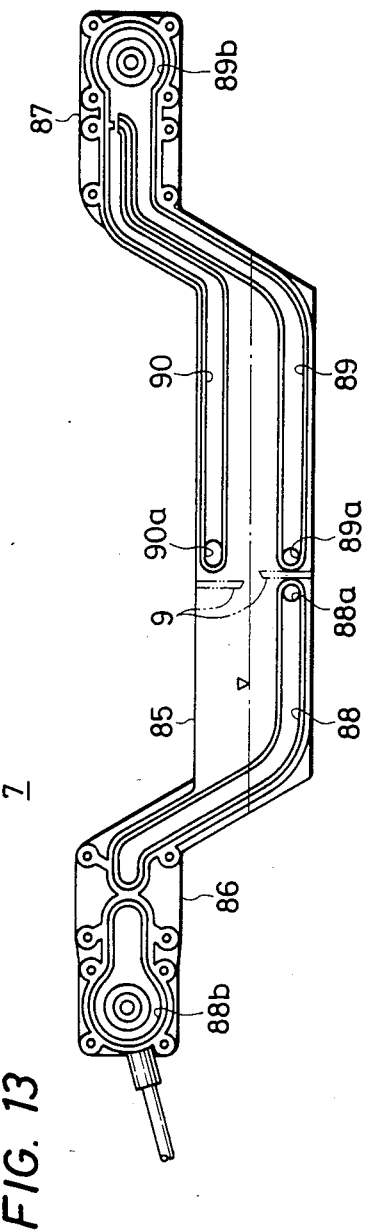
FIGS. 13 and 14 show front view and plan view of an ink tank.
Figure 14:
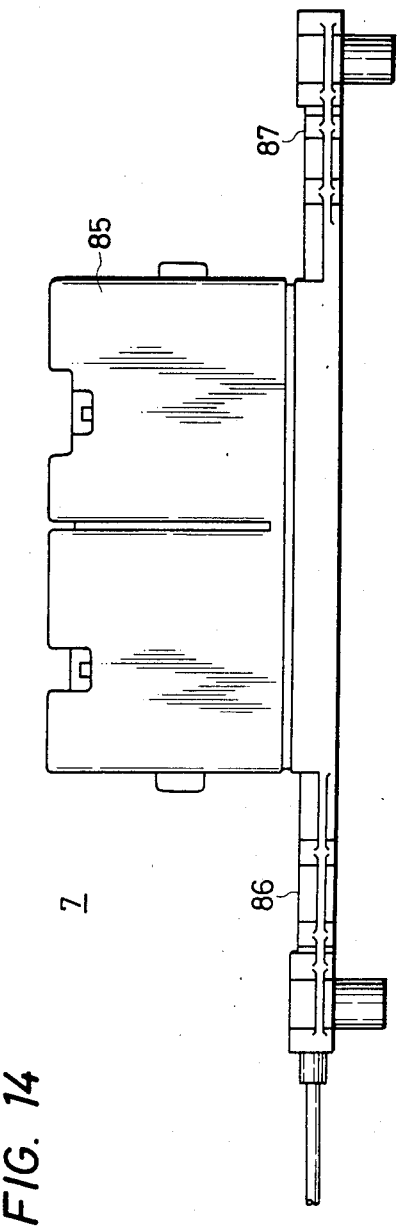

FIGS. 13 and 14 show a structure of the first ink tank 7. It has a flat tank 85 and arms 86 and 87 extending laterally from one side thereof. Ink flow paths 88 and 89 and an air path 90 are defined by the sides of the tank 85 and the arms 86 and 87, as shown in FIG. 13.

One ink flow path 88 corresponds to the flow path shown in FIG. 14, and the other flow path 89 corresponds to the flow path 3.

Ends of the flow paths 88 and 89 are guided to a center of the bottom of the tank 85 and connect to ports 88a and 89a formed to pass through the side of the tank.

The other ends of the flow paths 88 and 89 are connected to supply ports 88b and 89b of the arms 86 and 89.

One end of the air path 90 is connected to an atmosphere opening 90a formed to pass through the side wall of the tank above the center of the tank 85, and the other end is connected to the overflow sensor 65 which also serves as the breather.

The level sensors 9 are arranged to face the supply ports 88a and 89a, respectively.

The ink tank has the following function. The supply ports 88a and 89a are arranged at the bottom of the center of the tank, and the level sensors are arranged to face them. Accordingly, even if the ink tank is arranged obliquely, the inclined liquid level imparts the same affect to the supply ports and the level sensors. When the liquid levels at the supply ports 88a and 89a rise, it is determined that the ink remains higher than a predetermined level and the ink is not supplemented until the liquid levels fall. On the other hand, when the liquid levels at the supply ports 88a and 89a are low, it is determined that the ink level in the tank is lower than a predetermined level and the ink is supplied from the second ink tank 12. Accordingly, however the ink tank inclines, the supply of the ink to the head is assured. On the other hand, since the atmosphere opening 90a is formed at the center of the top of the tank, an air bubble does not remain in the ink even if the ink containing air bubbles are recirculated into the ink flow path when the ink is supplied by the pump, because the bubbles are directed to the atmosphere opening 90a from the liquid surface.

Since the supply ports 88a and 89a are spaced a predetermined distance from each other, they do not adversely affect each other.

[Structure of Overflow Sensor]

Figure 8:
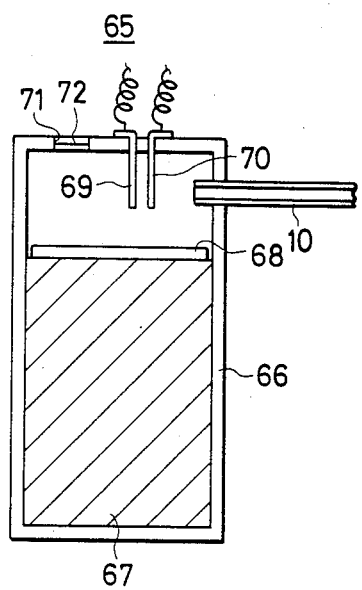
FIG. 8 is a longitudinal side view of an overflow sensor.

As shown in FIG. 8, the overflow sensor 65 has a container 66 of a predetermined shape, in which the ink absorber 67 having a predetermined capacity is housed. The end of the tube 10 extending from the first ink tank 7 is coupled to the space above the absorber 67. A drop cover 68 is mounted on the ink absorber 67, although it may be omitted. A pair of electrodes 69 and 70 project inwardly from the top end of the container 66 by a predetermined period. An air hole 71 is formed at the top end of the container 66. A breather membrane 72 is formed therein to suck air or exhaust air depending on a pressure.

It functions to adjust the pressure in the air chamber in the first ink tank 7 connected to through the tube 10.

The overflow sensor having such a structure has the following function.

When the recorder is not abnormal, a small quantity of ink may flow out by a change of pressure in the flow path. Such a small quantity of overflow ink drops onto the drop cover 68 and is absorbed by the absorber 67 through a gap between the drop cover 68 and the container 66. Accordingly, shorting of the electrodes 69 and 70 is prevented.

However, if some trouble occurs and a large quantity of overflow ink is exhausted from the tube 10, the ink drops onto the drop cover 68 at a higher rate than the ink is absorbed by the absorber 67 through the gap of the drop cover 68 and the electrodes 69 and 70 are shorted. As a result, the overflow is detected and the pump and the solenoid valve are stopped or closed so that the overflow trouble is interrupted at an initial stage.

[Operation]

The operation of the present embodiment is now explained. When the BJA 33 is stored for a long period or before it is transported to a user site, the BJA 33 is removed from the upper unit 20 of the recorder.

In the removed state, all solenoid valves A–C are mechanically closed and the connector 40 is disconnected so that the current to the motor is blocked and the pump is stopped.

On the other hand, when the BJA 33 is mounted in the upper unit 20, the solenoid valves A–C are automatically and mechanically opened to establish the flow paths. However, the pump is in the stop state. The recorder is in a stand-by status.

The states of the solenoid valves and pump in the above states are shown in upper columns of Table 1.

TABLE 1

|  |  | A | B | C | PUMP |
|---|---|---|---|---|---|
| BJA | OFF | C | C | C | Stop |
| BJA | SET | O | O | O | Stop |
| PRINT |  | O | O | O | Stop |
| SUPPLY |  | O | O | O | Forward |
| CIRCULATION |  | O | O | O | Backward |
| PRESSURE |  | C | O | O | Backward |

(C: Close O: Open)

The states of the solenoid valves and pump in various states to be described below are shown in lower columns of Table 1.

The operations in the respective modes are explained with reference to Table 1.

(1) Circulation mode

This mode is used to supply the ink to the head elements 1 or remove air bubbles in the head elements or ink flow paths and refresh the inks therein.

In this state, all solenoid valves are open as shown in Table 1, the cap 34' rises to cover the front side of the BJA 33 and the ink absorbers 44-47 are urged to the head elements 1. In this state, the pump P backwardly rotates and the ink sucked from the first ink tank 7 flows through the solenoid valve C, check valve 64 and flow path 8 and is supplied to the head elements 1 through the distributor flow path 5 and flow path 3 to push the ink out of the nozzles, and the ink reflows to the first ink tank 7 through the flow path 2, distributor flow path 4 and flow path 6 in which the solenoid valve A is mounted.

As the ink reflows, the ink is supplied to the head elements and air bubbles in the heads and the ink flow paths are collected into the first ink tank 7 and supplied to the overflow sensor 65 which also serves as the breather from the upper air chamber through the tube 10 and solenoid valve B.

(2) Print mode

In this mode, the ink necessary for recording is supplied from the first ink tank 7 to the head elements 1. In this state, all solenoid valves are closed as shown in Table 1 and the pump is stopped.

Since the ink jet printer in the present embodiment is of on-demand type, no pressure is applied to the ink when a record is to be made and the pump is not driven.

In this mode, as the ink is discharged from the head elements 1, the pressure in the head elements 1 is rendered negative and the ink flows through the flow path 6 and solenoid valve A and supplied to the head elements 1 through the distributor flow path 4 and flow path 2 so that a record is made in accordance with a record command.

(3) Supply mode

In this mode, the ink is supplied from the second ink tank 12 to the first ink tank 7. It is used when the use of the recorder is initiated or the quantity of ink in the first ink tank 7 reduces. In this mode, all solenoid valves A-C are open as shown in Table 1 and the pump is forwardly rotated as a result, the ink from the second ink tank 12 is supplied into the first ink tank 7 through the pump P so that the liquid level rises. Since the check valve 64 is inserted in series with the solenoid valve C, the ink does not reflow even if pressure is applied to the ink by the pump 9.

In this state, the cap 34' rises and the absorbers 44-47 are urged to the head elements 1.

(4) Pressure mode

This is a non-discharge recovery mode in which a pressure is applied to the ink when the ink in the nozzle is dried or the nozzle is clogged to push the ink out of the nozzle to eliminate the non-discharge state of the ink.

Only A of the solenoid valves is closed and others are open as shown in Table 1 and the pump is backwardly rotated.

In this sate, the cap 34' rises and the absorbers 44-47 are urged to the head elements 1.

The printer of the present embodiment has the following functions in addition to the functions of operating the printer in the modes shown in Table 1.

In the supply mode described above, if the liquid level does not rise, it means that the ink in the second ink tank 12 has been exhausted. Thus, the end of ink in the second ink tank 12 can be detected.

Even if the ink in the second ink tank 12 has been exhausted, some ink is reserved in the first ink tank 7. Accordingly, the print output during the exchange of the second ink tank 12 is not interrupted.

Because of the overflow sensor 65, the necessary elements of the recorder are deactivated when a large quantity of overflow occurs to prevent serious trouble.

In accordance with the present invention, since the mounting/removal of the cover which covers the head elements and mounting/removal of the head assembly are complementarily structured in this operation thereof, breakage of the electrical connecting unit by misoperation is prevented.

We claim:

1. An ink jet recorder having a head assembly removably mounted on a recorder body, said head assembly having a plurality of head elements each including a plurality of nozzles arranged widthwise of a record sheet, and a removable cover for covering front sides of said head elements, comprising:

a connector for electrical connection with the recorder body removably mounted on said head assembly by a lever; and a knob mounted on said cover to mechanically engage or disengage said head assembly with or from the recorder body;

said cover being constructed such that it cannot be mounted unless said lever is in a position to disconnect said connector.

2. An ink jet recorder having a removable head assembly including head elements for recording by discharging liquid, comprising:

coupling means for coupling said head assembly to a recorder body;

engage/disengage means mounted on a cover for front sides of said head elements for engaging and disengaging said coupling means; and switch means for turning on and off a power supply to said head assembly;

movement of said switch means being restricted such that it does not turn on the power supply when said cover is mounted.

3. An ink jet recorder according to claim 2 wherein said switch means has a projection.

4. An ink jet recorder according to claim 3 wherein said switch means is one of a rotary switch, a slide switch and a snap switch.

5. An ink jet recorder according to claim 2 wherein said coupling means and said engage/disengage means are constructed to be engaged with or disengaged from each other.

6. An ink jet recorder according to claim 5 wherein said engage/disengage means has a rectangular recess and said coupling means has a rectangular projection which is adapted to fit to said recess.

* * * * *